United States Patent
Nestler et al.

(10) Patent No.: US 8,832,774 B2
(45) Date of Patent: Sep. 9, 2014

(54) DYNAMIC MANAGEMENT OF ROLE MEMBERSHIP

(75) Inventors: Roger H. Nestler, Clay, NY (US); Daniel T. Dang, Jamesville, NY (US)

(73) Assignee: Exelis Inc., McLean, VA (US)

( * ) Notice: Subject to any disclaimer, the term of this patent is extended or adjusted under 35 U.S.C. 154(b) by 514 days.

(21) Appl. No.: 12/821,758

(22) Filed: Jun. 23, 2010

(65) Prior Publication Data

US 2011/0321159 A1    Dec. 29, 2011

(51) Int. Cl.
   *G06F 21/00*  (2013.01)
   *G06F 21/60*  (2013.01)
   *G06F 21/62*  (2013.01)

(52) U.S. Cl.
   CPC .......... *G06F 21/604* (2013.01); *G06F 21/6218* (2013.01)
   USPC .................................. 726/1; 726/27

(58) Field of Classification Search
   CPC .............................. G06F 21/604; G06F 21/6218
   USPC ....................................... 726/1, 27
   See application file for complete search history.

(56) References Cited

U.S. PATENT DOCUMENTS

| | | | |
|---|---|---|---|
| 5,911,143 A * | 6/1999 | Deinhart et al. ..................... 1/1 |
| 6,574,736 B1 * | 6/2003 | Andrews .......................... 726/21 |
| 6,749,114 B2 * | 6/2004 | Madani .......................... 235/380 |
| 7,185,192 B1 * | 2/2007 | Kahn ............................ 713/155 |
| 7,895,664 B2 * | 2/2011 | Desai et al. ..................... 726/27 |
| 2002/0129135 A1 | 9/2002 | Delany et al. |
| 2004/0010606 A1 | 1/2004 | Delaney et al. |
| 2004/0083367 A1 | 4/2004 | Garg et al. |
| 2005/0132215 A1 * | 6/2005 | Wang et al. .................... 713/200 |
| 2006/0090202 A1 * | 4/2006 | Liu et al. ........................ 726/17 |
| 2006/0277595 A1 | 12/2006 | Kinser et al. |
| 2007/0168530 A1 | 7/2007 | Delaney et al. |
| 2009/0260056 A1 | 10/2009 | Garg et al. |
| 2010/0306817 A1 * | 12/2010 | Grebenik et al. ................. 726/1 |

FOREIGN PATENT DOCUMENTS

| | | |
|---|---|---|
| EP | 1732024 A1 | 12/2006 |
| EP | 2400428 A1 | 12/2011 |
| EP | 2400429 A1 | 12/2011 |

OTHER PUBLICATIONS

Zhang et al. "A Rule-Based Framework for Role-Based Delegation" 2001, SACMAT'01, pp. 153-162.*
European Search Report for EP Application No. 11167557, dated Sep. 13, 2011, 2 pages.
European Search Report for EP Application No. 11167556, dated Sep. 8, 2011, 2 pages.

* cited by examiner

*Primary Examiner* — Jung Kim
*Assistant Examiner* — Thomas Ho
(74) *Attorney, Agent, or Firm* — Edell, Shapiro & Finnan LLC

(57) ABSTRACT

A method and system for dynamically managing entity membership in a role, using role configurations that comprise one or more dynamic role filters, which are linked to data sources such as databases or web services. The role filters are dynamic because, each time a role membership is queried, the role configuration and its component role filters must be evaluated with respect to the current information in the linked data sources. The roles may be used in role-based access control systems or entity identification systems.

17 Claims, 4 Drawing Sheets

FIG. 3

① → Role: Primary Developer  ② → Domain Names: [Ad.info.com ▼]

③ → Attributes: [Title ▼]  Condition: [Starts with ▼]  Values: [Software ▼]  [Add]

| User Attribute | Comparison Type | Match Criteria |
|---|---|---|
| Office Location | Starts with | Syracuse |
| Title | Starts with | Software |

④

⑤ → Office Location AND Title
[ ] [AND] [OR] [NOT] [ ] [Office Location ▼] [Find]

| Display Name | Title | E-mail Address |
|---|---|---|
| Bates, Kathy | Software Developer | K.Bates@itt.com |
| Cho, John | Software Designer | J.Cho@itt.com |
| Garcia, Andy | Software Programmer | A.Garcia@itt.com |
| Mirren, Helen | Software Architect | H.Mirren@itt.com |
| Smith, Will | Software Analyst | W.Smith@itt.com |

⑥

⑦ → [Apply]  [OK]  [Exit]

DYNAMIC MANAGEMENT OF ROLE MEMBERSHIP

STATEMENT REGARDING FEDERALLY-SPONSORED RESEARCH

This invention was made with government support under Contract No. FA8750-08-C-0114 awarded by the U.S. Department of Homeland Security. The government has certain rights in the invention.

BACKGROUND OF THE INVENTION

In any given enterprise, there are assets that are desired to be secured for a variety of reasons, for example to limit the number and type of employees that can access the assets, or to restrict the usage of the asset. For example, a conventional computer network may provide security for assets such as electronic files by providing access control settings or permissions, whereby the extent and type of users' access to various assets is set forth. For example, in a company, certain users may have read only privileges for a particular electronic document, other users may have read/write privileges, while still other users may have no access privileges at all.

These access control settings may be managed by means of role-based access controls (RBAC), where a user wishing to access an asset must be a member of a role permitted to access the asset. The use of role-based access controls is to a large extent static, that is, an administrator defines a role by directly mapping users or groups of users to the role, and must edit the role or group definitions to add or remove a user from the role. Due to the static nature of predefined role membership, the ability to quickly adapt to change is somewhat hindered.

SUMMARY OF THE INVENTION

Accordingly, embodiments of the present invention provide systems and methods for dynamically managing role membership using dynamic role filters. An embodiment provides methods for dynamically managing role memberships, comprising receiving a request to verify whether an entity is a member of a role, where the request to verify comprises a role name, in response to receiving the request to verify, retrieving a role configuration associated with the role name from a storage area, where the role configuration comprises one or more role filters and a logical statement specifying a logical relationship of the one or more role filters to each other, where each role filter comprises one or more specified options for an entity attribute, and is linked to a data source that comprises a value for the entity attribute, parsing the logical statement, and for each role filter in the logical statement, determining whether the role filter has a true or false result by determining whether the value in the data source matches the one or more specified options in the role filter, evaluating the truth or falsity of the logical statement by processing the true or false results for each role filter in the logical statement according to the logical relationship, and determining whether the entity is a member of the role, where if the logical statement is true the entity is a member, and if the logical statement is false the entity is not a member.

Another embodiment provides systems for dynamically managing role memberships, comprising a client and a role manager process. The client is operable by a user to send a request to verify whether an entity is a member of a role, where the request to verify comprises a role name, and to receive a role membership decision. The role manager process is configured to process the request to verify by: receiving the request to verify from the client, in response to the request to verify, retrieving a role configuration associated with the role name from a storage area, where the role configuration comprises one or more role filters and a logical statement specifying a logical relationship of the one or more role filters to each other, where each role filter comprises one or more specified options for an entity attribute, and is linked to a data source that comprises a value for the entity attribute, parsing the logical statement, and for each role filter in the logical statement, determining whether the role filter has a true or false result by determining whether the value in the data source matches the one or more specified options in the role filter, evaluating the truth or falsity of the logical statement by processing the true or false results for each role filter in the logical statement according to the logical relationship, creating the role membership decision, where if the logical statement is true the entity is a member, and if the logical statement is false the entity is not a member, and sending the role membership decision to the client.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE DRAWINGS

FIG. 3 is a screen shot illustrating a dynamic role configuration creation wizard according to an embodiment of the present invention.

DETAILED DESCRIPTION OF THE PREFERRED EMBODIMENTS

Figure 1:
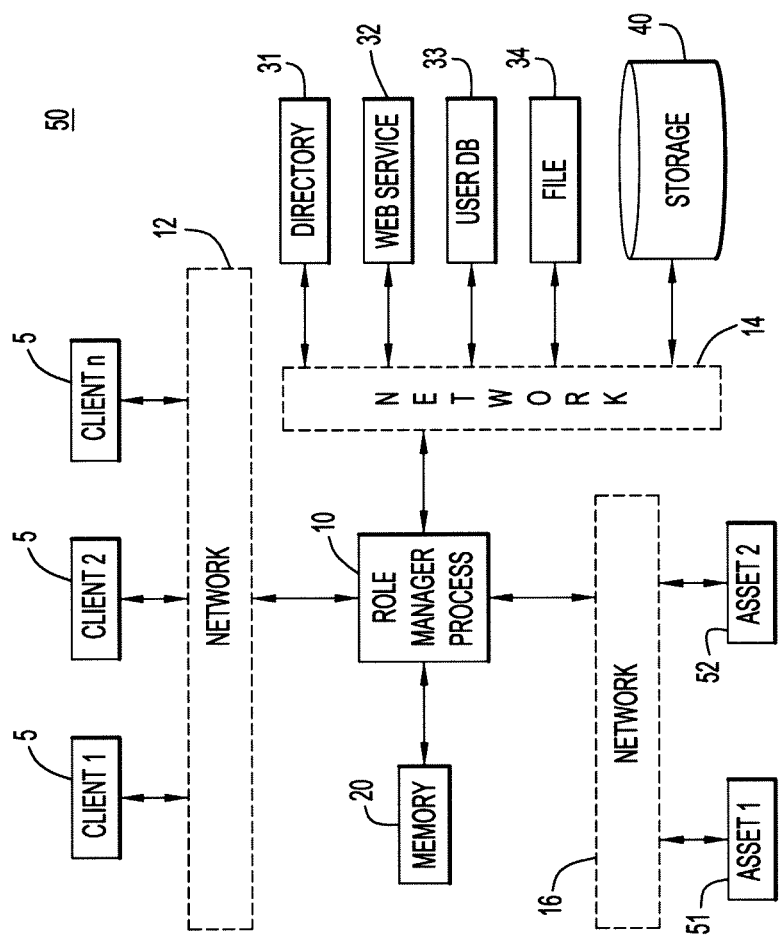
FIG. 1 depicts a block diagram of an exemplary role management system of an embodiment of the present invention.

The present invention is directed to methods and systems for dynamically managing role membership using dynamic role configurations, which comprise one or more dynamic role filters that are linked to data sources such as databases, web services, and the like. The role filters are dynamic because, each time the role is invoked, for example when a user tries to access an asset protected by a role-based asset control (RBAC) system, the role configuration and its component role filters must be evaluated with respect to the current information in the data source(s). The dynamic role configurations also provide context to role memberships, by requiring that a user or entity be fully defined by criteria other than a mere name, for example by requiring an appropriate job title, work location, or work responsibility in order to gain role membership.

Accordingly, unlike traditional static role definitions, the dynamic role filters are able to dynamically and automatically adapt in near real-time to changes in user information, thus ensuring that role membership is always up-to-date with current needs without the need to change the role configurations themselves. Because the system relies on role filter criteria to define the members of a role, errors that arise when a user is mistakenly ignored, assigned to an improper role, or deleted from a proper role may be greatly reduced or eliminated.

Further, the methods and systems provide customizable levels of granularity when defining role membership. For example, instead of a single-grained user name approach, the administrator may define a role in a fine-grained manner, by requiring multiple attributes to be satisfied before the user can be a member of a particular role. The administrator may create a role configuration and its role filter set, and then rely on a back-end algorithm that verifies role membership to determine who are members of the role.

Because the role filters are based on the value of user or entity attributes in the data sources, the role filters are not static rules based on who a user is, but instead are dynamic rules based on the validation of information about the user. For example, an RBAC system may be used to restrict access to certain types of information in an enterprise, for example financial reports and employee reviews may be restricted to members of a "Manager" role. The Manager role may be defined using a dynamic role filter requiring that a user have a job title of manager or department head, which is linked to an employee database containing job title information. When an employee receives a promotion from software engineer to manager, then the change in the job title attribute will automatically cascade down to all defined roles utilizing the job title attribute, and the next time the employee attempts to access information restricted to members of the "Manager" role, the system will automatically determine that the employee is a member of the role and access will be granted. Thus, the role definitions automatically adapt to changes in role filter data.

Referring now to the Figures, an exemplary system employing dynamic management of role membership according to an embodiment of the present invention is illustrated in FIG. 1. The system shown in FIG. 1 is particularly suited to the dynamic management of role memberships over a network or the Internet, however it should be understood that the systems of the present embodiments are not so limited, and could be used in a non-networked or self-contained system.

The depicted system 60 includes a role manager process 10, associated shared or working memory 20, data sources including a directory 31, a web service 32, a user database 33 and a flat file 34, a data storage area 40 for storing role configurations, and one or more assets 51, 52, which are connected over optional networks 12, 14, 16 to each other and to clients 5. The system 60 may include additional servers, clients, and other devices not shown, and individual components of the system may occur either singly or in multiples, for example, there may be more than one data storage area.

Generally, clients 5 provide an interface to the functions provided by the role management system 60, for example, mechanisms for creating, viewing, applying and exporting role configurations from the system, etc. The clients 5 can be configured to provide "visible" or "invisible" interfaces to the system. For example, in a first embodiment, a client 5 provides end-users with an invisible interface to the role management system, in that the end-users are able to access and manipulate assets to which access is controlled by roles being managed by the system, without the end-users even being aware of the system. In such an embodiment, the clients 5 would also provide a system administrator with a visible interface to the system, so that a system administrator is able to, e.g., create, view, apply and export role configurations from the system. For example, an end-user may use a client device such as an electronic access panel (e.g., for swiping access cards or allowing keypad entry) to access a laboratory facility, without being aware of the role management system, whereas a system administrator may use a client device such as a computer terminal to access the system itself. In a second embodiment, the clients 5 provide end-users and administrators with a visible interface to the system, although administrators may be provided with additional options (e.g., deleting or exporting roles) that are not available to end-users.

The role manager process 10 may provide an application program configured for creating, modifying, archiving, deleting or removing role configurations managed by the system 60, and may contain tools used for role management, access control, and facilities for performing searches and other operations related to the roles managed by the system 60. The role manager process 10 may be a function, application program interface (API), or web service that may be called as is needed to perform a role-related process such as creation of a role configuration, verification of membership in a role, or the like, or may be a server, for example a directory (e.g., LDAP, Active Directory, etc.) server or DBMS (e.g., Oracle, PostgreSQL, SQL Server, etc.) server. When a user accesses a particular role configuration, it is loaded from data storage area 40 into memory 20, so that the role configuration may be updated as needed by role manager process 10. Memory 20 may be implemented by any conventional or other memory or storage device, may be volatile (e.g., RAM, cache, flash, etc.), or non-volatile (e.g., ROM, hard-disk, optical storage, etc.), and may comprise any suitable storage capacity.

Networks 12, 14, 16 may be implemented by any quantity of any suitable communications media (e.g., WAN, LAN, Internet, Intranet, wired, wireless, etc.). The computer systems of the present embodiments may include any conventional or other communications devices to communicate over the networks via any conventional or other protocols, and may utilize any type of connection (e.g., wired, wireless, etc.) for access to the network. It is understood that any of the client 5, role manager process 10, memory 20, data sources 31, 32, 33, 34, data storage system 40 and assets 51, 52 may be local to one or more components of system 60, or may be remote from and in communication with one or more other components of system 60 via one or more networks 12, 14, 16.

Data sources 31, 32, 33, 34 may be any suitable number and type of data source as is needed to operate the system in the desired fashion. Data sources may comprise enterprise data sources (e.g., DB2, Oracle, IBM Enterprise Content Management (ECM) systems, ERP systems, etc.), personal and intra-organization data sources (e.g., spreadsheets (e.g., Microsoft Excel) or databases (e.g., Microsoft Access, MySQL, Sharepoint, Quickr, XML, etc.)), web-based data sources such as public databases (e.g., tax records, real estate records, court documents, etc.), web services, etc. Data storage system 40 may be implemented by any quantity of any type of conventional or other databases (e.g., network, hierarchical, relational, object, etc.) or storage structures (e.g., files, data structures, web-based storage, disk or other storage, etc.).

Assets 51, 52 may be any type of asset for which security is desired, and may be physical, electronic, or in any other suitable form. Exemplary physical assets may include facilities such as buildings, workspaces such as laboratories or file rooms, vehicles such as automobiles or motorcycles, office equipment such as computers, modems or copiers, areas or structures such as rooms, cabinets or garages, individual hardware components inside a device, etc. For example, the systems and methods may be used to dynamically manage role membership for roles that control use and access to hardware items, a computer network, or even access to a facility such as a laboratory or file room.

Exemplary electronic assets may include databases, electronic documents, server access, software applications, user profiles, etc. Electronic documents can be any type of electronic file or data now known or later developed, such as, but not limited to HTML and XML Web content, document images, electronic records, database records, word processing documents, presentation slides, office documents, e-mail messages or archives, games, textual data, electronic books, graphics, audio, video, SMS or MMS messages, other digital representations of information, and/or combinations thereof The systems and methods may be used not only in RBAC systems, but also in other systems in which a user or entity may be a member of a role. For example, in a data classification system, the entity may be a data file, and data identity roles may be defined using role filters based on size, contents, file location, associated application(s), or the like. Similarly, in a file redaction system, a role such as "profanity" may be defined in terms of role filters linked to data sources of, e.g., "dirty words", scatological terms, vulgar or obscene phrases, etc., and a role such as "sensitive information" may be defined in terms of role filters linked to data sources of personnel information, confidential project names, credit card numbers, phone numbers, etc. As the data sources are updated, the role filters and the roles are automatically updated to reflect the changed information.

Other potential applications include an identity verification system, for example for access to a secured facility, where individuals may be identified as permitted role members by a variety of physical and forensic characteristics such as retinal scans and hand geometry in combination with other information such as security clearance level, military rank, passport number, etc. As the data sources are updated, for example by adding retinal scan information for new employees, and changing military rank as personnel are promoted, the system automatically utilizes that information to dynamically alter role membership to limit access to authorized users only.

Figure 2:
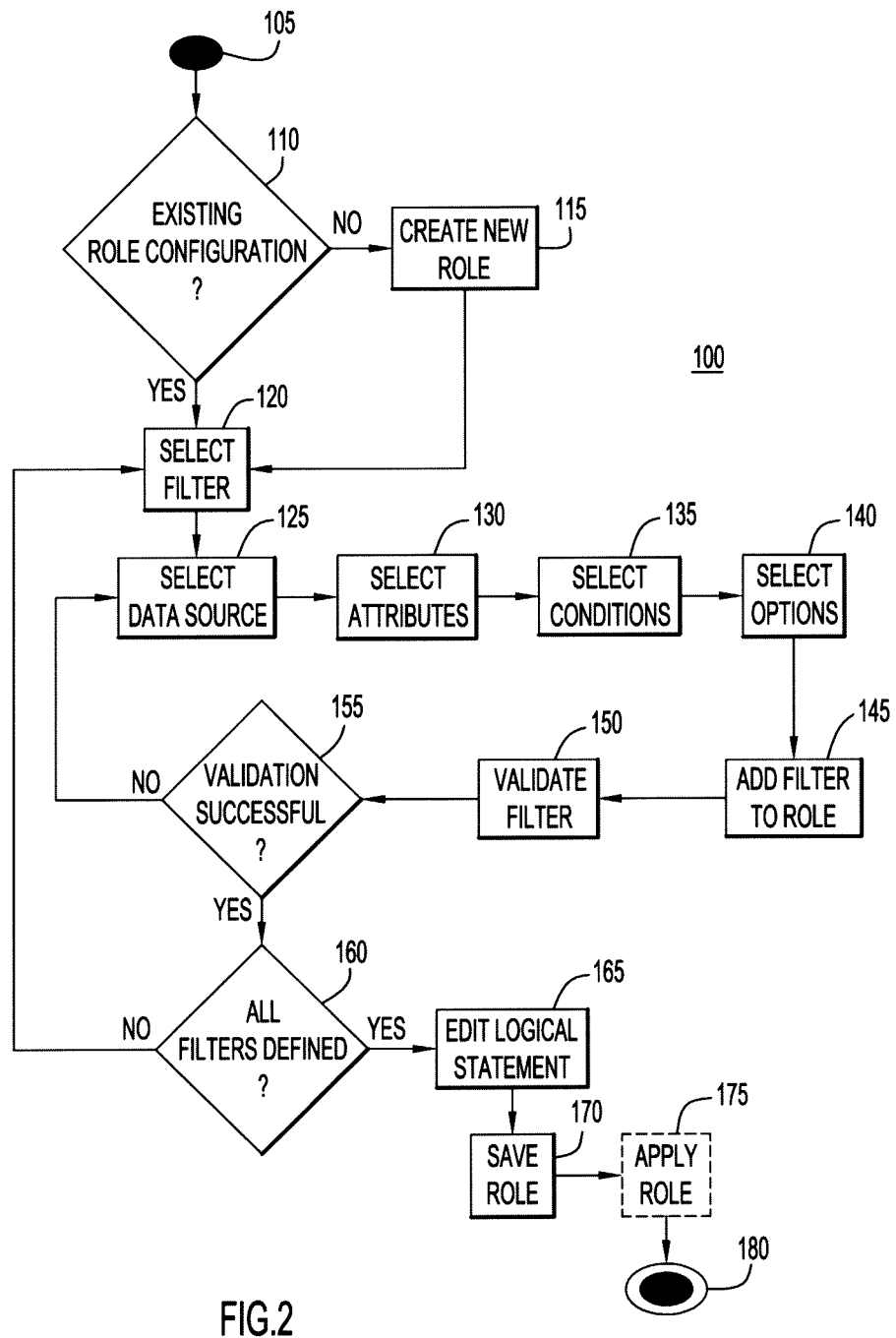
FIG. 2 is a flow chart illustrating the creation or modification of a dynamic role configuration according to an embodiment of the present invention.

Referring now to FIG. 2, an administrator may use the system that has been previously described, and particularly the role manager process 10 to perform the steps of FIG. 2, in which reference numeral 100 generally designates a flow chart depicting a process for creating or modifying a dynamic role configuration. The process begins at 105, and in step 110 determines whether the role configuration already exists, and if yes, loads the role configuration into memory and proceeds to step 120. If not, a new role configuration is created in step 115, and the process proceeds to step 120.

In step 120, the administrator selects a role filter. A role filter defines the kinds or types of entities that are members of the role being configured, instead of simply listing entity names or user names. Each role configuration comprises a set of one or more role filters that together define the role. In step 125, the administrator selects a data source. The data source may be any source that contains or obtains information used by the role filters, for example information about employees or other entities. The data source includes at least one entity attribute that has a value, for example, an employee database may comprise an employee status attribute with possible values of full time, part time, contractor or intern, and a work location attribute with possible values of New York Office, California Office, etc. Depending on the type of role filter desired, different sources may be used. The administrator may configure the connection to the data source, for example if the data source is a web service, configuring the connection may involve entering an IP address or other location where to access the service, a port, and credentials such as a user name and password.

In step 130, the administrator selects one or more entity attributes to be used in the filter (e.g., employee type, security clearance level, department, work location, postal code, manager, member of a particular group, etc.). In step 135, the administrator selects one or more conditions, which specify the permitted variations of the value for the entity attribute. For example, the conditions might be "starts with", "ends with", "is not", "is", "is exactly", "contains", etc. In step 140, the administrator selects the options for the role filter. The options depend on the role filter, the data source that is selected, and the entity attributes of the data source, and may be a text string, an expression, or other suitable entry. For example, if the role filter is based on security clearance and the selected data source is an active directory of employee information comprising a security clearance attribute, the possible values for the attribute include, e.g., none, FOUO, confidential, secret, top secret, etc. The available options may directly match a possible value, e.g., secret clearance, or may match with multiple values, e.g., secret or higher clearance, which matches with secret, top secret, and higher level clearances. The options may also be user-defined. Together, the conditions and options for the entity attribute are known as the filter criteria.

In step 145, the administrator adds the role filter to the role configuration, and in step 150 validates the filter. The role filter may be validated by any suitable means, for example verifying the connection to the linked data source, and verifying that the linked data source comprises a value for the entity attribute. In step 155, the system determines whether the validation was successful, where if both verification steps are successful the role filter is validated and the process proceeds to step 160, and if one or both of the verification steps are unsuccessful the role filter is not validated, and the process returns to step 125.

In step 160, the process determines whether all role filters have been defined, for example by prompting the administrator whether there is another role filter to add to the role configuration. If there are additional filters, the process returns to step 120, and if not, the process proceeds to step 165. In step 165, the administrator can create or edit a logical statement that specifies one or more role filters and the relationship between them, using logical expressions such as AND, OR and NOT. For example, the administrator may enter the following logical statement: Employee Type AND Security Clearance. In step 170, the administrator saves the role configuration, and optionally in step 175, the administrator applies the role configuration. The process ends at step 180.

An exemplary Graphic User Interface (GUI) illustrating an embodiment of process 100 for creating a role configuration is shown in FIG. 3 with respect to an exemplary "Employee Type" role filter. At reference point 1, the administrator enters in the role name, in this case "Primary Developer", and at reference point 2, the administrator selects a data source, for example by entering or selecting a domain name for a data source such as an LDAP directory. The selection of the source may be made by selecting one or more data sources from a drop-down list of data sources, or by manually entering location information for a data source or sources. For the depicted role configuration, the administrator has selected an Active Directory with name of "Ad.info.com". The GUI may also provide the administrator with a pop-up window (not shown) that allows for the entry of source information such as an IP address, port, user name, and password, or that allow the administrator to test the connection to the data source at this time to determine if the information entered is valid.

At reference point 3, the administrator selects and configures the entity attributes for each data source. For example, for the selected "Title" attribute, the administrator has selected the "Starts With" condition, and the "Software" option. Thus, when the selected "Title" attribute is applied in a filter with the specified condition and option, it will match with entity attribute values such as "Software Engineer", "Software Programmer", "Software Designer", etc. The administrator may then click on the "add" button to add this entity attribute to the filter set. The filters in the filter set are displayed at reference point 4. At reference point 5, the administrator edits the logical statement for the role configuration.

The administrator may click on the "find" button to apply the filter(s) to see which entities will be selected by the role filter, and the results of this application are displayed at reference point 6. These results illustrate the entities that are members of this particular role, in this case company employees who are assigned to the Syracuse office location and who have titles beginning with the word "Software". At reference point 7, the administrator may save or apply this role configuration, or exit the GUI.

Figure 4:
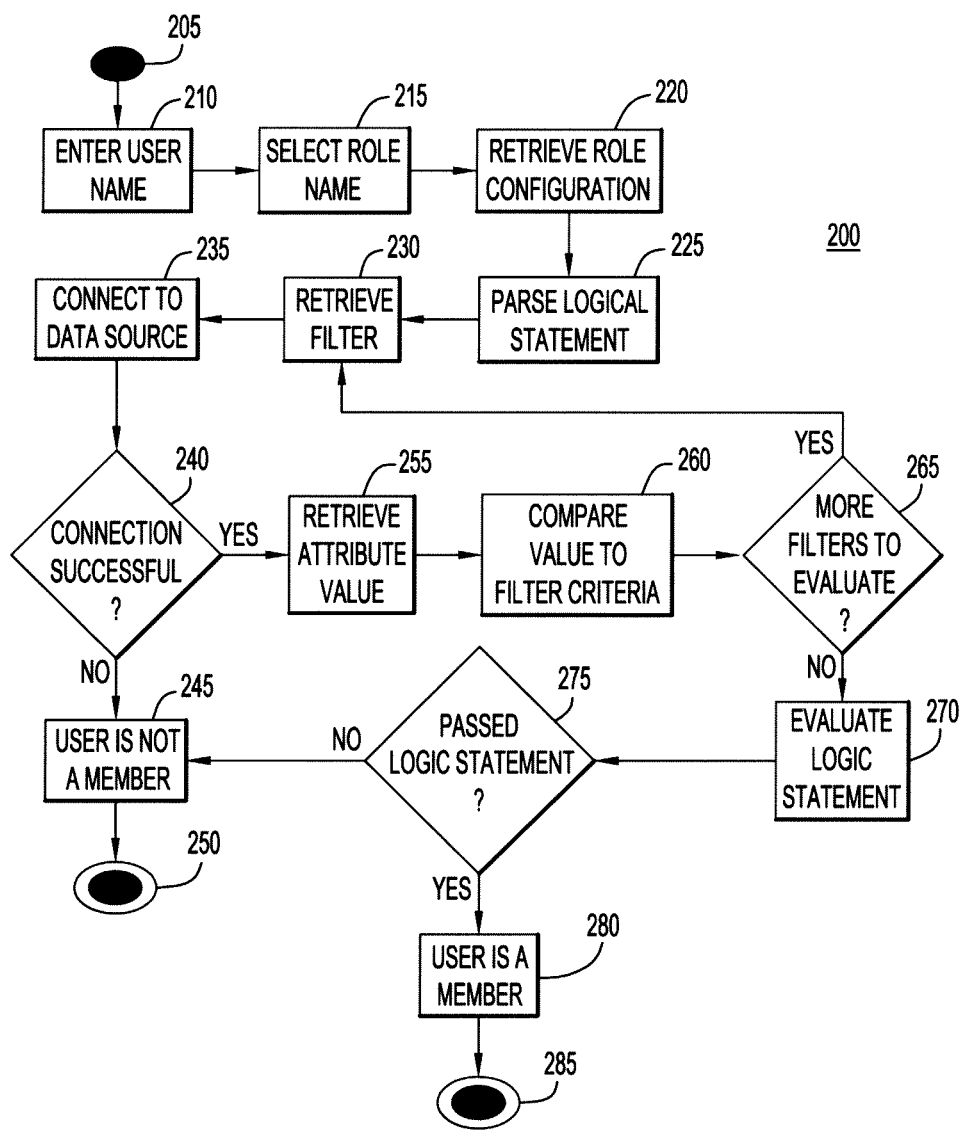
FIG. 4 is a flow chart illustrating the verification of a user as a member of a role according to an embodiment of the present invention.

Referring now to FIG. 4, the reference numeral 200 generally designates a flow chart depicting a process for verifying an entity or user as a member of a particular role, which may be performed by the system that has been previously described, and particularly the role manager process 10. Process 200 may be provided as a function, application programming interface (API), or web service. The process begins at 205, and may be triggered by a user request to access an asset protected by a role-based access control, or may be called by a process, application, or operating system to verify the membership of an entity in a particular role. In step 210 the user or entity name is entered, in step 215 the role name is entered, and in step 220 the role configuration for that role is retrieved, for example from a storage area. In step 225, the process parses the logical statement and loads each of the role filters found in the statement.

Each role filter is then individually processed, using steps 230 through 265. At step 230, a role filter is selected and retrieved, and at step 235 the connection to the data source for that role filter is loaded. At step 240 the process determines if a connection was established, and if not, the process proceeds to step 245 where the user or entity is determined not to be a member of the role (because membership could not be verified), and ends at step 250. If a connection was established in step 240, the process proceeds to step 255 and retrieves the entity attribute value(s) associated with the user or entity from the data source, and in step 260 compares the retrieved value(s) to the filter criteria specified by the role filter. For example, for an "Employee Title" role filter, the retrieved value may be "Software Engineer", which agrees with the specified condition ("Starts With") and option ("Software") in the role filter, and therefore the role filter will have a "true" result. Or, for example, for an "Employee Title" role filter, the retrieved value may be "Financial Analyst", which does not agree with either of the filter criteria, and therefore the role filter will have a "false" result. At step 265 the process determines if there are any other role filters to process, and if yes, returns to step 230. If not, the process proceeds to step 270.

In step 270, the process evaluates the logic statement to determine whether the final result is true or false, based on whether each of the associated role filters have a true or false result, and in step 275 the process determines whether the logic statement was passed. In other words, the process determines if the overall result of the logic statement is true, in which case the process proceeds to step 280, or if the overall result of the logic statement is false, in which case the process proceeds to step 245. If true, then in step 280 the process determines that the user or entity is a member of the role, and then ends in step 285, or if false, then in step 245 the process determines that the user or entity is not a member of the role, and then ends in step 250.

The embodiments of the present invention can take the form of an entirely hardware embodiment, an entirely software embodiment or an embodiment containing both hardware and software elements. In a preferred embodiment, the invention is implemented in software, which includes but is not limited to firmware, resident software, microcode, etc. The software may be available on a recordable medium (e.g., magnetic, optical, floppy, DVD, CD, etc.) or in the form of a carrier wave or signal for downloading from a source via a communication medium (e.g., network, LAN, WAN, Intranet, Internet, etc.). The software may be part of an operating system or a specific application, component, program, module, object, or sequence of instructions.

It is to be understood that the software may be implemented in any desired computer language and could be developed by one of ordinary skill in the computer arts based on the functional descriptions contained in the specification and flow charts illustrated in the drawings. By way of example only, the software may be implemented in the C#, C++, Python, Java, XML or PHP programming languages, and data storage may be implemented in MySQL, Oracle, SQL Server, IBM DB2, Informix or a flat database, etc. Further, any references herein to software performing various functions generally refer to computer systems or processors performing those functions under software control. The software and/or algorithms described above and illustrated in the flow charts may be modified in any manner that accomplishes the functions described herein, and the functions in the flow charts or description may be performed in any order that accomplishes a desired operation.

The computer systems may alternatively be implemented by any type of hardware and/or other processing circuitry. The various functions of the computer systems may be distributed in any manner among any quantity of software modules or units, processing or computer systems, objects, data structures and/or circuitry, where the computer or processing systems may be disposed locally or remotely to each other and communicate via any suitable communications medium (e.g., LAN, WAN, Intranet, Internet, hardwire, modem connection, wireless, etc.).

Furthermore, the present embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. In a preferred embodiment, the computer-usable or computer-readable medium is a tangible medium.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. Memory may be implemented by any conventional or other memory or storage device (e.g., RAM, cache, flash, etc.), and may include any suitable storage capacity. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the processing system to become coupled to other processing systems or remote printers or storage devices through intervening private or public networks. Modems, cable modem and Ethernet cards are just a few of the currently available types of network adapters.

End-user systems may be implemented by any quantity of conventional or other computer systems or devices (e.g., computer terminals, personal computers (e.g., IBM-compatible, Apple MacIntosh, tablet, laptop, etc.), etc.), cellular telephones, personal data assistants (e.g., Palm Pre, Droid, iPhone, etc.), etc., and may include any commercially available operating system (e.g., AIX, Android, Linux, OSX, Sun Solaris, Unix, Windows, etc.) and any commercially available or custom software (e.g., browser software, communications software, word processing software, etc.). These systems may include displays and input devices (e.g., keyboard, mouse, voice recognition, etc.) to enter and/or view information. The end-user systems may be local to the process and data storage areas, or remote from and in communication with the server and data storage areas via a network.

Networks may be implemented by any quantity of any suitable communications media (e.g., WAN, LAN, Internet, Intranet, wired, wireless, etc.). The computer systems may include any conventional or other communications devices to communicate over the networks via any conventional or other protocols, and may utilize any type of connection (e.g., wired, wireless, etc.) for access to the network.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for dynamically managing role memberships, comprising:
    receiving a request to create or modify a role configuration, wherein the role configuration comprises one or more role filters and a logical statement defining a logical relationship of the one or more role filters to each other, wherein each role filter comprises an entity attribute and one or more values for the entity attribute, and each role filter is linked to a corresponding data source;
    validating the one or more role filters prior to saving the role configuration, wherein said validation comprises, for each particular role filter:
        verifying a connection to the corresponding data source linked to the particular role filter; and
        verifying that the corresponding data source linked to the particular role filter stores one or more possible values for the entity attribute of the particular role filter, wherein each of the possible values is associated with one or more entity names, and wherein if both verification steps are successful the particular role filter is validated, and wherein if one or both verification steps are unsuccessful the particular role filter is not validated;
    editing the logical statement that defines the logical relationship of the one or more role filters; and
    responsive to successfully validating all of the one or more role filters, saving the role configuration comprising the validated one or more role filters and the edited logical statement;
    receiving a request to verify whether a specific entity is a member of the role configuration, the request to verify comprising a role name associated with the role configuration and a specific entity name associated with the specific entity;
    retrieving the role configuration from a storage area;
    parsing the logical statement, and for each role filter in the logical statement, determining whether the specific entity name matches one of the entity names associated with the value of the entity attribute in the data source corresponding to the role filter;
    evaluating the logical statement by processing the determination of matching the specific entity name for each role filter according to the logical relationship; and
    determining whether the specific entity is a member of the role configuration based on the evaluation of the logical statement.

2. The method of claim 1, wherein said determining whether the specific entity name matches one of the entity names associated with the value of the entity attribute in the data source corresponding to the role filter comprises, for each role filter:
    connecting to the corresponding data source;
    retrieving the one or more possible values for the entity attribute and the entity names associated with the one or more possible values from the corresponding data source;
    comparing the retrieved values to the one or more values for the entity attribute in the role filter;
    comparing a list of eligible entity names based on the comparison between the retrieved values and the values for the entity attribute in the role filter; and
    determining whether the list of eligible entity names comprises the specific entity name.

3. The method of claim 2, further comprising:
wherein, if for any role filter, a connection to the corresponding data source cannot be made, then the specific entity name does not match the entity name associated with the value for the entity attribute in the role filter.

4. The method of claim 1, further comprising:
receiving a request to configure one of the one or more role filters;
selecting a plurality of data sources comprising a first data source and a second data source to be linked to the role filter, wherein each data source comprises a value for one or more entity attributes, and a first entity attribute linked to the first data source is different than a second entity attribute linked to the second data source;
selecting one or more values for the first entity attribute linked to the first data source to include in the role filter;
selecting one or more values for the second entity attribute linked to the second data source to include in the role filter; and
saving the role filter.

5. The method of claim 4, further comprising:
configuring a connection between the first data source and its linked role filter by entering location information for the first data source in the linked role filter; and
configuring a connection between the second data source and its linked role filter by entering location information for the second data source in the linked role filter.

6. The method of claim 4, further comprising:
for each of the first and second entity attributes, including in the role filter one or more conditions that describe permitted variations of the values for the respective first and second entity attributes.

7. The method of claim 1, wherein the data source is a database.

8. The method of claim 1, wherein the data source is a web service.

9. A system for dynamically managing role memberships, comprising:
an administrative client device operable by a user to:
send a request to create or modify a role configuration to a role manager process, wherein the role configuration comprises one or more role filters and a logical statement defining a logical relationship of the one or more role filters to each other, wherein each role filter comprises an entity attribute and one or more values for the entity attribute, and each role filter is linked to a corresponding data source;
receive a set of configuration options from the role manager process, wherein the configuration options comprise a role filter list of one or more role filters that can be included in the role configuration;
select one or more configuration options from the received set of configuration options, wherein the selected configuration options include one or more selected role filters from the role filter list;
edit the logical statement; and
send the selected configuration options and the logical statement to the role manager process;
a client device operable by a user to:
send a request to verify whether a specific entity is a member of the role configuration, wherein the request to verify comprises a role name associated with the role configuration and a specific entity name associated with the specific entity; and
receive a role membership decision;
the role manager process configured to create or modify the role configuration, on one or more computing devices, by:
receiving the request to create or modify the role configuration from the administrative client;
sending the set of configuration options to the administrative client;
receiving the selected configuration options and the edited logical statement from the administrative client;
validating the selected role filters, wherein said validation comprises, for each particular selected role filter:
verifying a connection to the corresponding data source linked to the particular selected role filter; and
verifying that the corresponding data source linked to the particular selected role filter stores one or more possible values for the entity attribute of the particular selected role filter, each of the possible values associated with one or more entity names, wherein if both verification steps are successful the particular selected role filter is validated, and wherein if one or both verification steps are unsuccessful the particular selected role filter is not validated; and
saving the role configuration comprising the received configuration options, the validated role filters, and the edited logical statement;
wherein the role manager process is further configured to process the request to verify, on one or more computing devices, by:
receiving the request to verify from the client;
in response to the request to verify, retrieving the role configuration associated with the role name from a storage area,
parsing the logical statement, and for each role filter in the logical statement, determining whether the specific entity name matches one of the entity names associated with the value of the entity attribute in the data source corresponding to the role filter;
evaluating the logical statement by processing the determination of matching the specific entity name for each role filter according to the logical relationship; and
creating the role membership decision based on the evaluation of the logical statement; and
sending the role membership decision to the client.

10. The system of claim 9, wherein the role manager process is implemented by a processor configured with logic to process the request to verify.

11. The system of claim 9, wherein the role manager process is further configured to determine whether the specific entity name matches one of the entity names associated with the value of the entity attribute in the data source corresponding to the role filter by, for each role filter:
connecting to the corresponding data source;
retrieving the one or more possible values for the entity attribute and the entity names associated with the one or more possible values from the corresponding data source;
comparing the retrieved values to the one or more values for the entity attribute in the role filter;
compiling a list of eligible entity names based on the comparison between the retrieved values and the values for the entity attribute in the role filter; and
determining whether the list of eligible entity names comprises the specific entity name.

12. The system of claim 9, further comprising:
the administrative client operable by a user to:
send a request to create or modify one of the role filters to the role manager process;
receive a set of filter options from the role manager process;
select one or more filter options from the received set of filter options; and
send the selected filter options to the role manager process;
wherein the role manager process is further configured to create or modify the role filter by:
receiving the request to create or modify the role filter from the administrative client;
sending the set of filter options to the administrative client, wherein the filter options comprise a source list of data sources that can be linked to the role filter, wherein each data source comprises a value for each of one or more entity attributes, and each entity attribute of each data source may be different than each entity attribute of the same or another data source;
receiving the selected filter options from the administrative client, wherein the selected filter options include one or more selected data sources from the source list, and, for each selected data source one or more selected entity attributes from that data source and one or more options for each selected entity attribute; and
saving the role filter comprising the received filter options.

13. The system of claim 12, wherein the selected filter options further comprise, for each selected entity attribute, one or more conditions that describe permitted variations of the values for the entity attribute.

14. The system of claim 9, wherein the data source is a database.

15. The system of claim 9, wherein the data source is a web service.

16. The method of claim 1, further comprising:
parsing the logical statement, and for each role filter in the logical statement:
retrieving the one or more possible values for the entity attribute and the entity names associated with the one or more possible values from the corresponding data source;
comparing the one or more possible values for the entity attribute from the corresponding data source with the value of the entity attribute in the role filter; and
based on the comparison, creating a list of eligible entity names comprising at least one of the entity names stored in the corresponding data source; and
based on the parsing of the logical statement and the lists of eligible entity names from each role filter, compiling a list of potential entity names that can fulfill the role configuration.

17. The system of claim 9 wherein the role manager process is further configured to:
parse the logical statement, and for each role filter in the logical statement:
retrieve the one or more possible values for the entity attribute and the entity names associated with the one or more possible values from the corresponding data source;
compare the one or more possible values for the entity attribute form the corresponding data source with the value of the entity attribute in the role filter; and
based on the comparison, create a list of eligible entity names comprising at least one of the entity names stored in the corresponding data source; and
based on the parsing of the logical statement and the lists of eligible entity names from each role filter, compile a list of potential entity names that can fulfill the role configuration.

* * * * *